United States Patent [19]
Robards, Jr.

[11] Patent Number: 5,783,803
[45] Date of Patent: Jul. 21, 1998

[54] FOOD WARMING APPARATUS

[76] Inventor: Chester F. Robards, Jr., c/o Prince Castle Inc., 355 E. Kehoe Blvd., Carol Stream, Ill. 60188

[21] Appl. No.: 575,817

[22] Filed: Dec. 20, 1995

[51] Int. Cl.⁶ .................................................. F27D 11/00
[52] U.S. Cl. ........................ 219/392; 219/385; 219/521; 219/386; 99/483
[58] Field of Search ........................ 219/392, 394–396, 219/385–387, 521; 99/483; 312/236; 126/273 R, 275 R, 275 E

[56] References Cited

U.S. PATENT DOCUMENTS

| | | | |
|---|---|---|---|
| 1,377,092 | 5/1921 | Phaneuf . | |
| 2,274,285 | 2/1942 | Walker . | |
| 2,831,098 | 4/1958 | Luscher . | |
| 2,919,339 | 12/1959 | Hilliker . | |
| 3,051,582 | 8/1962 | Muckler et al. . | |
| 3,222,114 | 12/1965 | Stentz | 312/214 |
| 3,311,434 | 3/1967 | Dyer et al. | 312/214 |
| 3,353,886 | 11/1967 | Tompkins | 312/214 |
| 3,385,952 | 5/1968 | Mix | 219/387 |
| 3,601,582 | 8/1971 | Boisfleury | 219/388 |
| 3,751,629 | 8/1973 | Eisler | 219/385 X |
| 3,886,346 | 5/1975 | Meyers | 219/386 |
| 3,974,358 | 8/1976 | Goltsos | 219/387 |
| 4,019,022 | 4/1977 | Seider et al. | 219/386 |
| 4,030,476 | 6/1977 | Hock | 126/246 |
| 4,041,277 | 8/1977 | Shumrak et al. | 219/386 |
| 4,093,041 | 6/1978 | Davis et al. | 219/386 |
| 4,126,775 | 11/1978 | Wyatt | 219/400 |
| 4,132,216 | 1/1979 | Guibert | 312/236 |
| 4,173,378 | 11/1979 | Hanson et al. | 312/296 |
| 4,194,109 | 3/1980 | Springer | 219/386 |
| 4,198,555 | 4/1980 | Bellavoine | 219/10.55 R |
| 4,210,675 | 7/1980 | Liebermann | 426/233 |
| 4,225,204 | 9/1980 | Bellavoine | 312/236 |
| 4,232,789 | 11/1980 | Springer | 206/562 |
| 4,233,495 | 11/1980 | Scoville et al. | 219/386 |
| 4,235,282 | 11/1980 | Filippis et al. | 165/61 |
| 4,285,391 | 8/1981 | Bourner | 165/30 |
| 4,323,110 | 4/1982 | Rubbright et al. | 165/30 |
| 4,345,143 | 8/1982 | Craig et al. | 219/411 |
| 4,346,756 | 8/1982 | Dodd et al. | 219/386 |
| 4,495,932 | 1/1985 | Bratton | 99/483 X |
| 4,757,184 | 7/1988 | Swanson et al. | 219/400 |
| 4,784,054 | 11/1988 | Karos et al. | 99/483 |
| 5,069,273 | 12/1991 | O'Hearne | 165/12 |
| 5,159,973 | 11/1992 | Pennington et al. | 165/48.1 |
| 5,182,438 | 1/1993 | Oakes et al. | 219/386 |
| 5,203,258 | 4/1993 | Tippmann et al. | 99/483 |
| 5,223,290 | 6/1993 | Alden | 426/243 |
| 5,272,317 | 12/1993 | Ryu | 219/392 X |
| 5,285,051 | 2/1994 | DeGrow et al. | 219/386 |
| 5,375,511 | 12/1994 | Huie et al. | 99/483 |
| 5,396,046 | 3/1995 | Oelfke | 219/386 |
| 5,404,935 | 4/1995 | Liebermann | 165/48.1 |

*Primary Examiner*—Peter S. Wong
*Assistant Examiner*—K. Shin
*Attorney, Agent, or Firm*—John R. Hoffman

[57] ABSTRACT

A food warming apparatus includes a housing defining at least one warming cavity having a ceiling. A heater warms food products within the cavity. A grate is provided within the cavity spaced below the ceiling of the cavity. At least one food tray is provided for containing food products and is supportable on the grate beneath the ceiling of the cavity. A seal is operatively associated between the top of the tray and the ceiling of the cavity. The grate includes a biasing portion for biasing the tray upwardly toward the ceiling to assure operability of the seal.

34 Claims, 5 Drawing Sheets

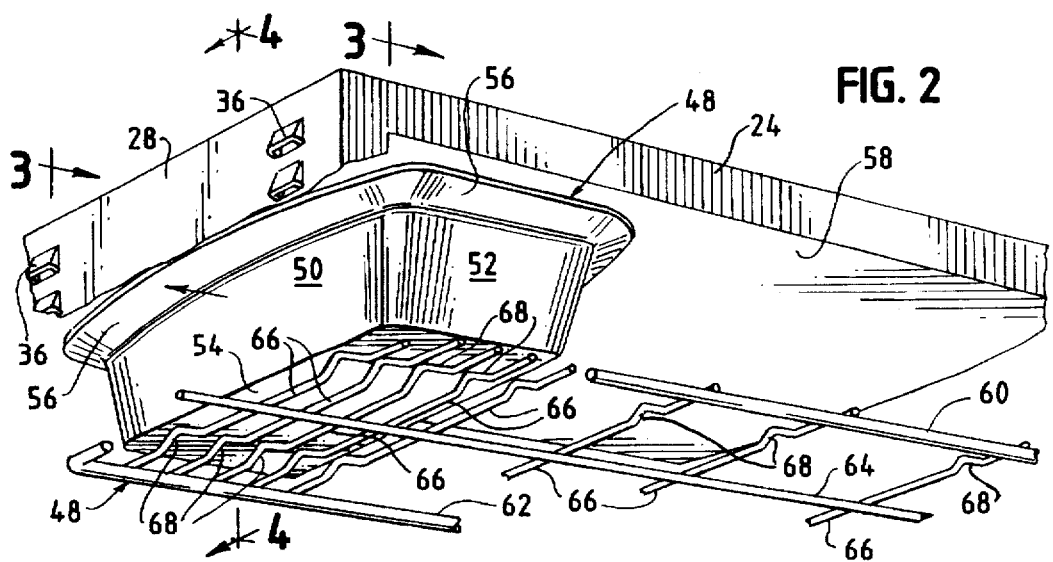
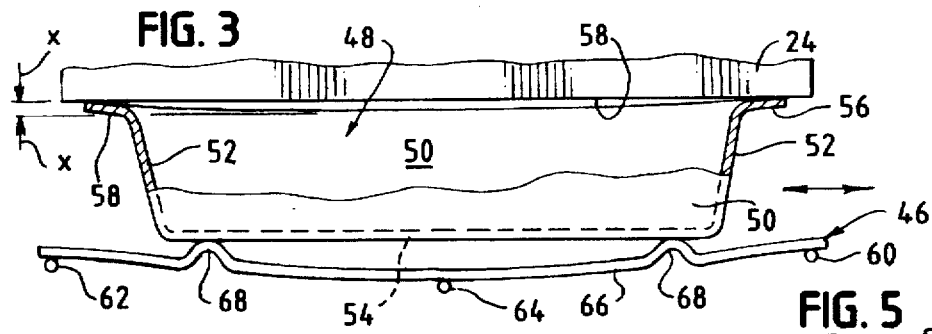
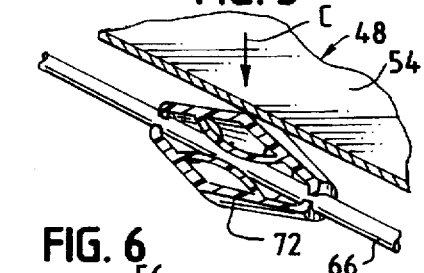
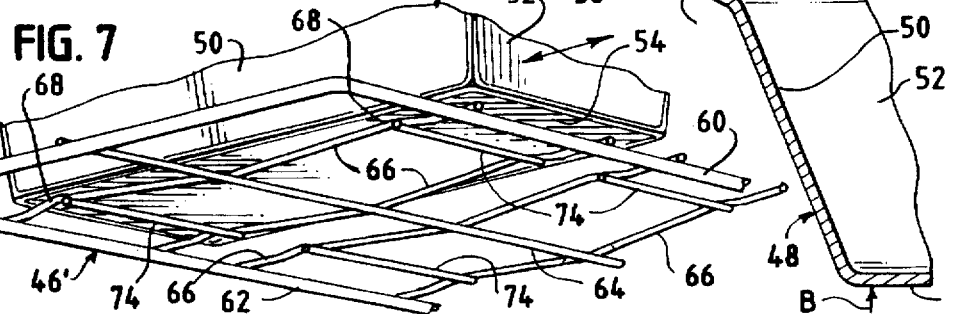
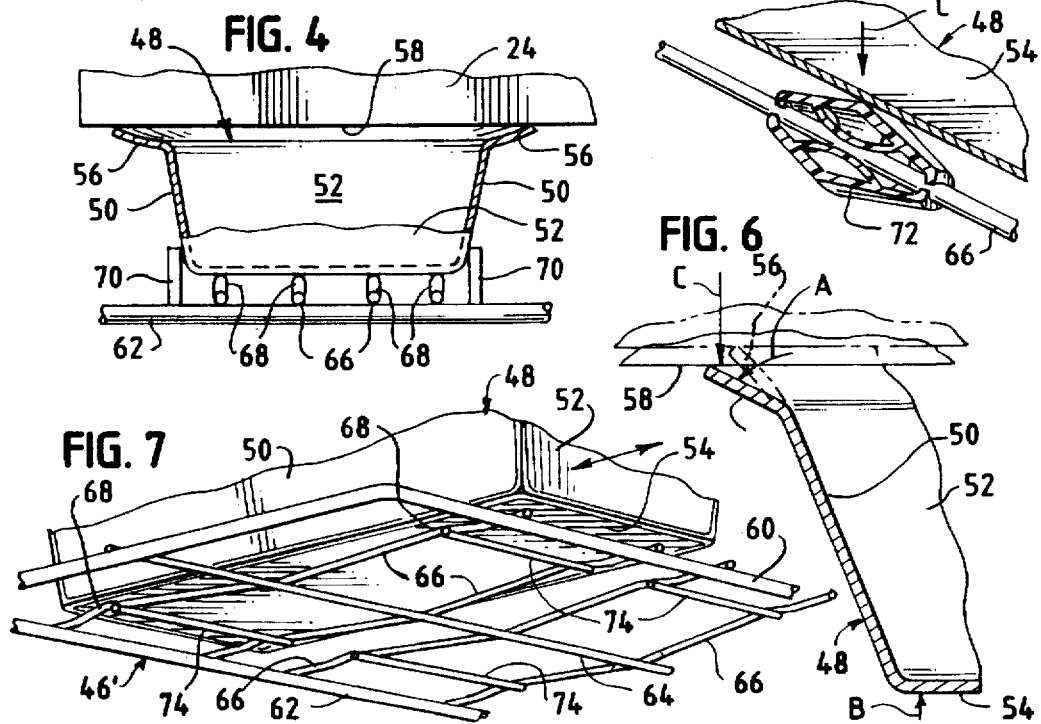

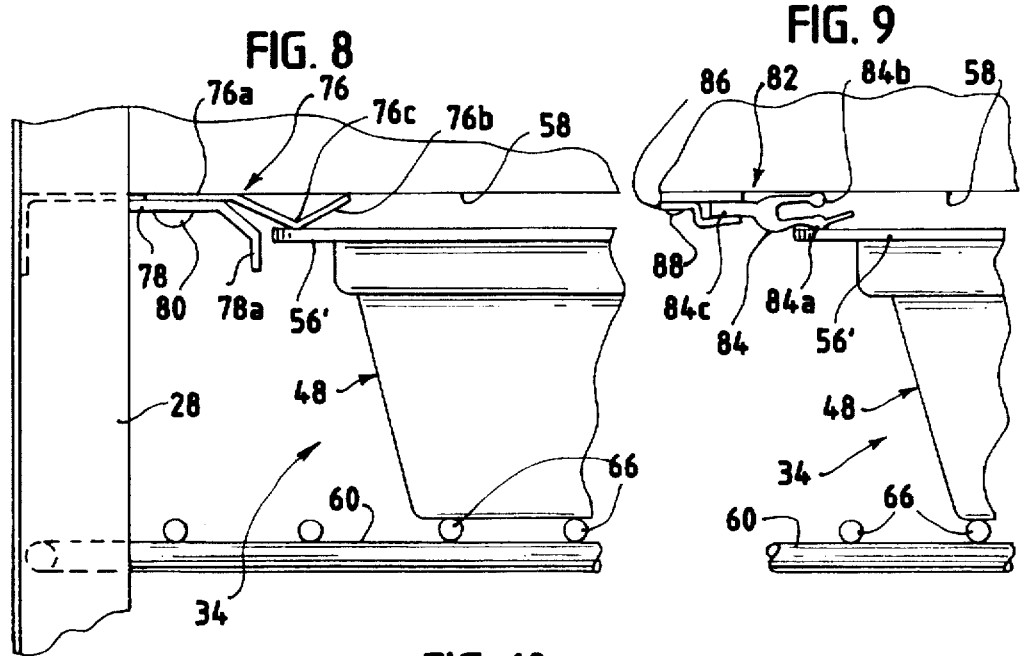
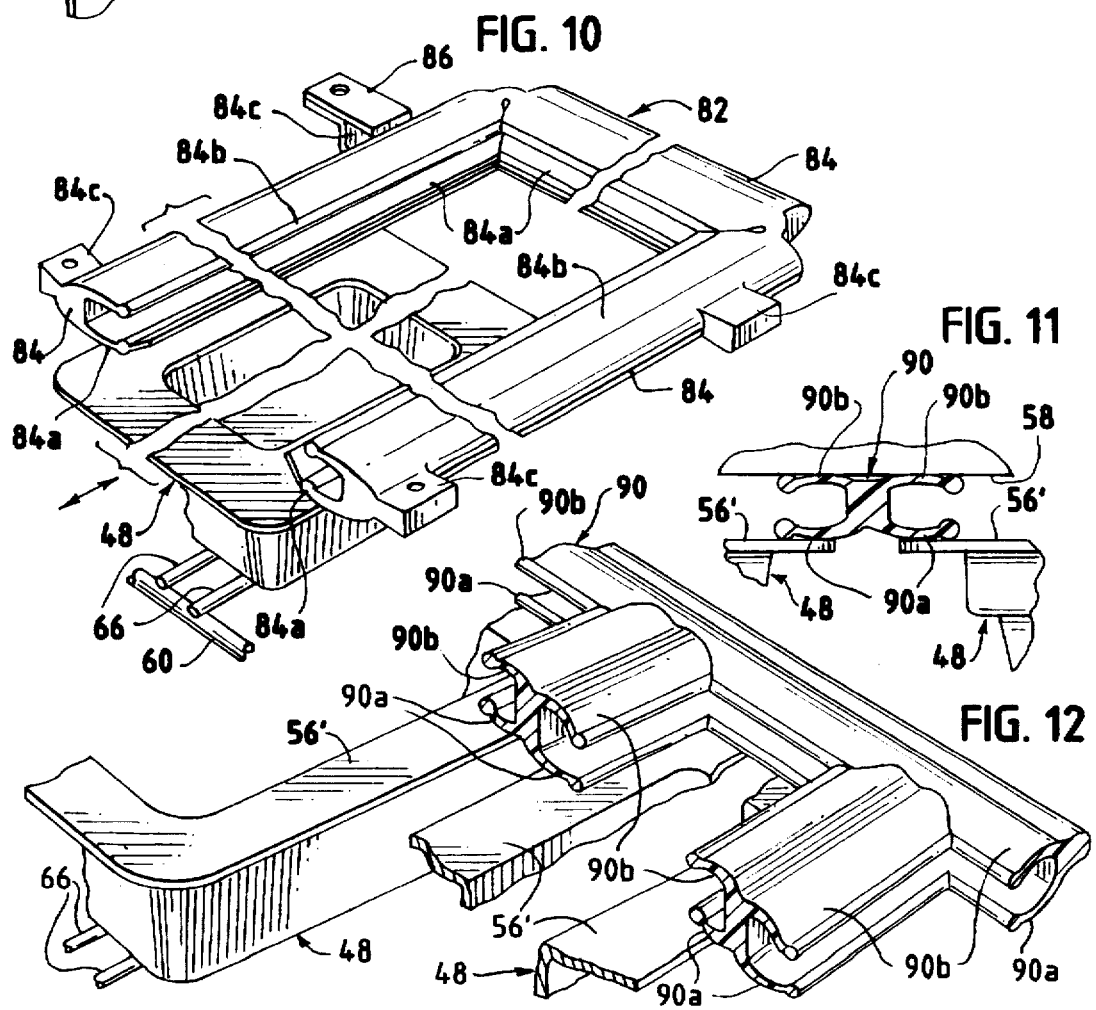

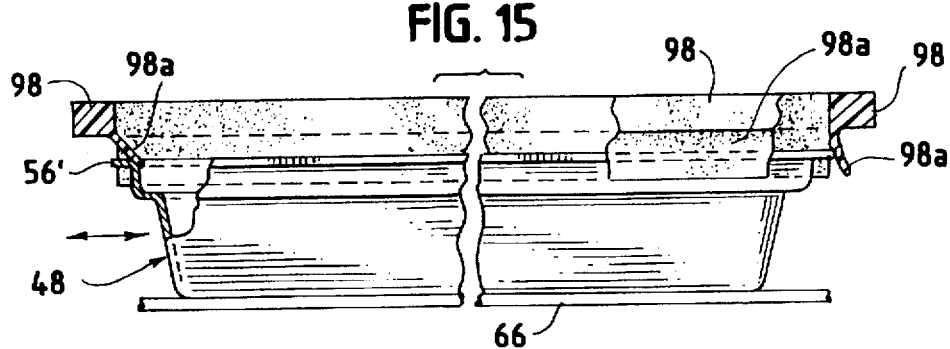
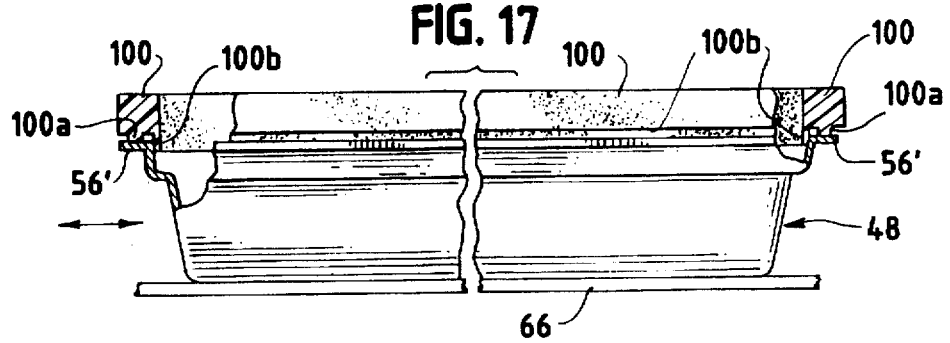
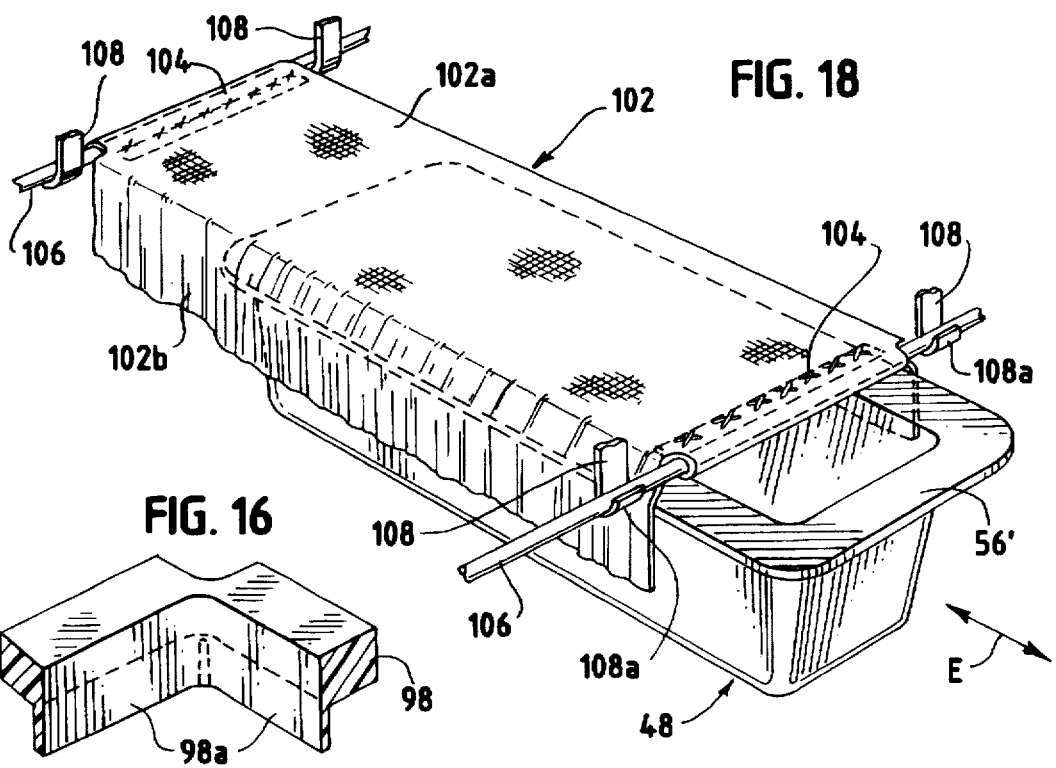
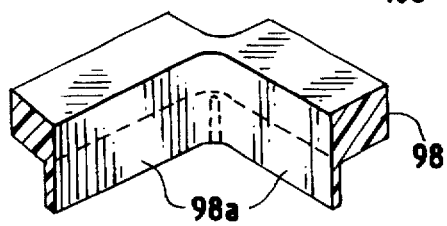

FOOD WARMING APPARATUS

FIELD OF THE INVENTION

This invention generally relates to the art of food preparation and, particularly, to a food warming apparatus for controlling the temperature and moisture content in food products held in food trays.

BACKGROUND OF THE INVENTION

Various types of ovens or food warming apparatus are used in a wide variety of applications, particularly in the food preparation and distribution fields. Such apparatus may range from a completely closed oven to an open-front oven to a pass thru oven which is open at both its front and rear ends. For instance, in high volume restaurants or similar establishments, various menu items are precooked, and the precooked items are held in warming ovens to maintain the temperature of the items for serving to a customer shortly thereafter. An example is a common sandwich. The sandwich may include a meat component and bread component, with the meat component being precooked and the bread component being pre-toasted, for instance. These precooked components are temporarily held in separate trays which are placed in ovens within which the temperatures of the components are maintained until the components are assembled and prepared as the final menu item for serving to the customer. The ovens sometimes are called staging cabinets or holding cabinets. They do not heat the precooked food components up to a given temperature, but they maintain or hold the prescribed precooked temperature of the components.

One of the problems in using food warming apparatus of the character described above is that the food components have a tendency to lose their prescribed moisture content while being temporarily held in food trays in the warming apparatus. Various sealing systems have been used to seal the food trays to contain the moisture of the food products therewithin. For instance, a food tray may simply be provided with a sealing cover. However, the cover often loses its seal, and the cover creates an extraneous component which must "travel" with the food tray and cause space problems as well as efficiency problems. Seals have been provided within the ovens themselves, but the seals often lose their effectiveness during use because no compensation is made for wear of the sealed components over their normal life. They also are not cost-effective and do not assure proper positioning of the food trays.

The present invention is directed to solving these problems by providing various improvements in food warming apparatus for sealing food trays and maintaining temperature and moisture control over food products held within the trays without undue labor costs.

SUMMARY OF THE INVENTION

An object, therefore, of the invention is to provide a new and improved food warming apparatus of the character described.

In the exemplary embodiment of the invention, the food warming apparatus includes a housing defining at least one warming cavity having a ceiling. Heating means are provided for warming food products within the cavity. Tray support means are provided within the cavity spaced below the ceiling of the cavity. In the preferred embodiment, the tray support means is a grate. At least one food tray is provided for containing food products, and the tray is supportable on the tray support means beneath the ceiling of the cavity. Seal means are operatively associated between the top of the tray and the ceiling of the cavity. The tray support means include biasing means for biasing the tray upwardly toward the ceiling to assure operability of the seal means.

As disclosed herein, the tray support means comprises a grate which includes a plurality of spring rod members to provide the biasing means for biasing the tray upwardly toward the ceiling. The grate may be of a size for supporting a plurality of the food trays, with some of the spring rod members being positioned to support only individual tones of the trays so that the biasing means for one tray is independent of the biasing means for any other tray. This provides for efficiency when different food products have different weights and/or the number of trays in use varies.

Still further, the food tray is shown herein as being elongated, and some of the spring rod members extend in the direction of elongation of the food tray. The spring rod members have riser means spaced along the spring rod members for engaging the bottom of the tray only near opposite ends of the tray. The riser means may comprise integral hump portions formed in the spring rod members. The riser means alternatively may be provided by separate sleeve members or other means mounted on the spring rod members.

The seal means may be provided on the top of the food tray. For instance, the seal means may comprise a flexible lip about a substantial portion of the top of the food tray. The seal means also may be provided on the ceiling of the cavity in the housing. Mounting means may be provided for readily removably securing the seal means to the ceiling to allow for ready removal of the seal means for cleaning and replacement.

Another feature of the invention is to provide the food tray with a flexible upper lip therealong. The ceiling may be formed in a convex configuration between the ends of the tray for engaging the flexible upper lip. This ensures that a seal is maintained the full length of the tray.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 2 is a perspective view looking upwardly toward one of the grates supporting a single food tray;

FIG. 3 is a partial vertical section taken generally along line 3—3 of FIG. 2;

FIG. 4 is a partial vertical section taken generally along line 4—4 of FIG. 3;

FIG. 5 is a section through a sleeve member forming an alternative embodiment of the riser means on the rod members of the tray-supporting grate;

FIG. 6 is a fragmented vertical section through one side of the food tray, showing the flexibility of the upper lip of the tray;

FIG. 7 is a fragmented view similar to the left-hand end of FIG. 2, showing an alternative arrangement of the spring rods of the grate;

FIG. 8 is a fragmented elevational view showing an embodiment of a seal means removably mounted to the ceiling in one of the food warming cavities;

FIG. 9 is a view similar to that of FIG. 8, but of another embodiment of a seal means;

FIG. 10 is a perspective view of the seal means of FIG. 9, substantially about a food tray;

FIG. 11 is a section through a seal means engaging the tops of two adjacent trays;

FIG. 12 is a fragmented perspective view showing more of the type of seal means shown in FIG. 11;

FIG. 15 is a partial vertical section, through another type of seal means securable to the ceiling of the housing cavity;

FIG. 16 is an enlarged perspective view of the corner of the seal means shown in FIG. 15;

FIG. 17 is a view similar to that of FIG. 15, but showing still a further type of seal means mountable to the ceiling of the housing cavity; and FIG. 18 is a perspective view of a canopy-type sealing means.

DETAILED DESCRIPTION OF THE PREFERRED EMBODIMENTS

Figure 1:
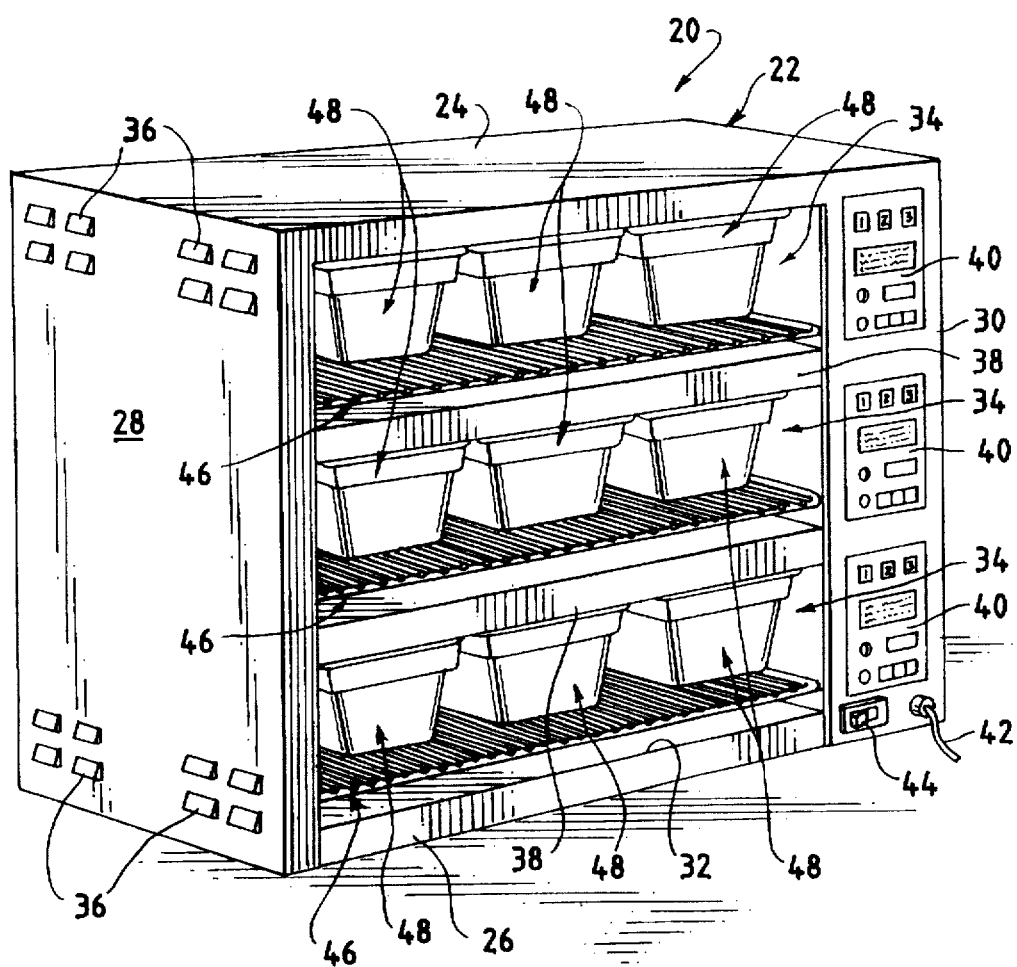
FIG. 1 is a perspective view of a food warming apparatus in which the concepts of the invention are applicable.

Referring to the drawings in greater detail, and first to FIG. 1, the various concepts of the invention are applicable for use in a food warming apparatus, generally designated 20, which includes a generally rectangular or box-shape housing, generally designated 22. The housing has a top wall 24, a bottom wall 26, a left side wall 28 and a right side wall 30. The housing is open at the front end thereof, as at 32, and is closed by a rear wall (not shown). The housing defines a plurality of warming cavities, generally designated 34.

It should be understood that the open-front housing 24 defines but one type of food warming apparatus with which the concepts of the invention are applicable. For instance, apparatus 20 may as well be a completely closed oven, as well as a pass thru oven or warming apparatus having both front and rear open ends. The apparatus also need not be rectangularly shaped, but can take a variety of configurations.

Still referring to FIG. 1, the entire housing 22 is fabricated of sheet metal material and at least top wall 24, bottom wall 26, side walls 28 and 30 and the rear wall (if present) are of a dual-wall construction to define insulating chambers within the walls. Vents 36 are stamped and formed out of side walls 28 and 30 (not shown) to allow circulation through the chambers and the escape of warm air from therewithin. Lastly, while the outside of housing 22 (i.e. at least top wall 24 and side walls 28 and 30) may have a brushed appearance for aesthetic purposes, preferably the insides of the top, rear and side walls have high reflective surfaces to enhance the efficiency of the warming apparatus.

Cavities 34 within housing 22 are separated by generally horizontal partitions 38. These partitions and bottom wall 26 comprise heating platforms for heating the food products within the apparatus by radiant heat. Details of such heating platforms are shown in co-pending application Ser. No. 08/395,116, filed Feb. 27, 1995 and assigned the assignee of the present invention, and which is incorporated herein by reference. Suffice it to say, each heating platform 38 and 26 supplies the heat within the immediately above warming cavity 34. Alternatively, heating platforms can be provided above and below each cavity. Separate controls 40 are provided on the front of side wall 30 for the heating means for each cavity. Power is supplied to the apparatus and the heating platforms from an appropriate source through a power cord 42. An on-off switch 44 also is shown in the front panel of side wall 30.

Referring to FIGS. 2 and 3 in conjunction with FIG. 1, a tray support means in the form of a grate, generally designated 46, is supported by appropriate mounting means within each cavity 34 spaced above the respective heating platform 38 or 26. Each grate supports a plurality (three in the preferred embodiment) of food trays, generally designated 48. As seen best in FIGS. 2 and 3, each food tray 48 is elongated and includes long side walls 50 and short side walls 52 extending upwardly from a bottom wall 54 and terminating in a continuous lip 56 about the entire upper periphery of the tray. The tray has an open top within the continuous lip 56. The trays are sized and configured so that they rest on one of the grates 46, with the upper lips 56 of the trays engaging a roof or ceiling 58 (FIGS. 2 and 3) within each cavity 34 of the housing. As seen in FIG. 1, three trays 48 are supportable cross-wise on each grate 46 within each cavity 34, with the longitudinal dimensions of the grates extending in a front-to-rear direction within the cavities.

As best seen in FIGS. 2 and 3, each grate 46 is fabricated of spring rod members joined together, such as by welding, to include a front tie rod 60, a rear tie rod 62 and a center tie rod 64. The tie rods are welded to stringer rods 66 which extend in a front-to-rear direction within cavities 34, i.e. in the longitudinal direction of the trays when positioned in the cavities. As best seen in FIG. 3, each stringer rod 66 has riser means in the form of humps 68 bent integrally with each spring rod for engaging the bottom of a respective one of the trays 48 only near opposite ends of the trays. This allows the trays to flex somewhat between their ends when supported on the grates and decreases the insertion forces of the trays into the cavities.

In essence, with grates 46 being fabricated of rod members, spring rod members 616 which form the stringer rods of the grates have inherent biasing means for biasing trays 48 upwardly toward the ceilings 58 within cavities 34, while tie rods 60, 62 and 64 provide rigid support for heavy food trays. Now, referring to FIG. 6 in conjunction with FIGS. 2 and 3, it can be seen that peripheral lip 56 and/or walls about the top of each tray 48 is flexible or yieldable outwardly in the direction of arrow "A" (FIG. 6). Therefore, as biasing pressure is applied upwardly in the direction of arrow "B" by the inherent biasing of grates 46, a reactionary downward force component is created in the direction of arrow "C" by ceiling 58 against lip 56 to force the lip outwardly in the direction of arrow "A". The lip thereby forms a seal against the ceiling of the housing cavity. The unstressed condition of lip 56 is shown in phantom in FIG. 6. The sealed condition of the lip is shown in full lines in FIG. 6 as well as in FIGS. 2 and 3.

FIG. 3 also shows a concept wherein ceiling 58 within each housing cavity is convex in the longitudinal direction of food trays 48. The amount of curvature of the ceiling is represented by arrows "X". The trays may be fabricated of plastic material and, thus, have a tendency, when heavily loaded by the biasing action of the plate on the ends of the trays, to bow between their ends. The convex ceiling compensates for this bowing and ensures a full sealing engagement with flexible lips 56 of the trays.

FIG. 4 shows upper peripheral lip 56 of one of the trays 48 in sealing engagement with the ceiling 58 within one of the housing cavities. FIG. 4 also shows an alternative feature wherein side guide members 70 may be provided for maintaining the transverse positions of trays 48. The guide members may be provided in the form of bars welded to front and rear tie rods 60 and 62, respectively. Alternatively, the guide members can be positionally adjustable along tie rods 60 and 62 transversely of the respective cavity. Detents (similar to humps 68) can be provided on the guide members 70 to define front and rear position stops for the food trays.

FIG. 5 shows an alternate embodiment of a riser means on stringer rods 66 for engaging the bottoms of the trays only near the opposite ends of the trays. The riser means shown in FIG. 5 are in the form of molded plastic components 72 which are slip-fit onto the stringer rods. These sleeves 72 would replace the integrally formed humps 68 in the embodiment shown in FIGS. 2–4. The sleeves also may be used as the biasing means in the system, with the grate rods being substantially rigid.

FIG. 7 shows a form of a grate, generally designated 46', which again includes front and rear tie rods 60 and 62, along with a center tie rod 64. Again, stringer rods 66 have a form of the humps 68 for engaging the bottoms of the food trays only near the opposite ends of the trays. However, in the embodiment of grate 46' in FIG. 7, cross tie rods 74 are provided to join the stringer rods 66 under each individual tray. In other words, cross tie rods 74 do not extend the entire width of the grate as do tie rods 60, 62 and 64. Cross tie rods 74 are limited to extend only the width of a separate food tray. Therefore, the cross tie rods provide further support for the stringer rods, but the cross tie rods do not interfere with the provision of biasing means for each food tray which is independent of the biasing means for any other tray.

FIG. 8 shows a seal means, generally designated 76, which is mounted to the ceiling 58 of one of the cavities 34. In this embodiment, the upper lip 56' of food tray 48 is not flexible and does not provide the sealing function as described above in relation to lip 56 in FIGS. 1–4 and 6. Seal means 96 includes a generally flexible plastic strip having a flat portion 76a for clamping against ceiling 58 and a V-shaped portion 76b for engaging ceiling 58. The V-shaped portion defines an apex 76c for engaging the top of lip 56' about the periphery of the food tray. A clamp 78 clamps the sealing plastic strip against ceiling 58 by a plurality of readily removable fasteners 80, such as sheet metal screws. Clamp 78 has a vertical lip 78a for facilitating positioning food tray 48 within the housing cavity. Ceiling means 76 is readily removable for cleaning or replacement purposes simply by unscrewing fastening means 80.

FIGS. 9 and 10 show another form of sealing means, generally designated 82, for mounting to the ceilings 58 within cavities 34. Sealing means 82 includes a molded unitary member 84 extending substantially entirely about the area of one of the food trays 48, with a sealing flange 84a for engaging the peripheral lip 56' of the food tray. A second sealing flange 84b engages ceiling 58. Sealing member 84 includes a plurality of outwardly projecting tabs 84c for engagement in a clamp 86 readily removably secured to ceiling 58 by a plurality of removable fasteners 88. Seal member 84 is molded of flexible plastic or rubber material. Clamps 86 also can have side positioning means for the food trays similar to lips 78a in FIG. 8.

FIGS. 11 and 12 show a molded sealing means similar to that of FIGS. 9 and 10, but the sealing means includes a seal member, generally designated 90, for sealing against the upper lips 56 of a plurality of food trays 48. In other words, a singular seal member 90 can be molded for sealing with all three trays in any single warming cavity 34. Sealing member 90 can be secured between the ceiling of the respective cavity and the top of the tray by appropriate means. Sealing member 90 has lower sealing flanges 90a for engaging the upper lips 56' of adjacent trays 48, along with upper sealing flanges 90b for engaging the ceiling 58. Sealing member 90 is sufficiently rigid to be self-supporting under its own weight to prevent sagging between the clamps.

Figure 13:
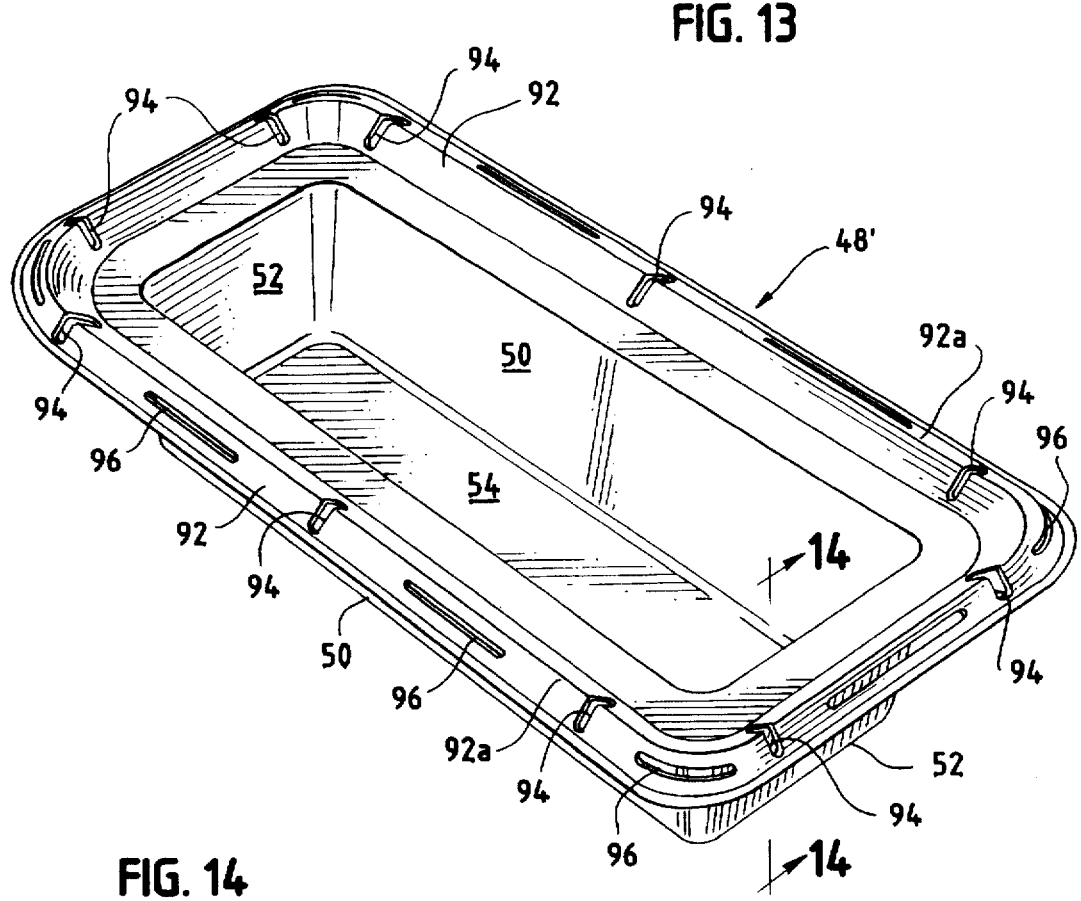
FIG. 13 is a top perspective view of a food tray having a sealing lip thereabout.
Figure 14:
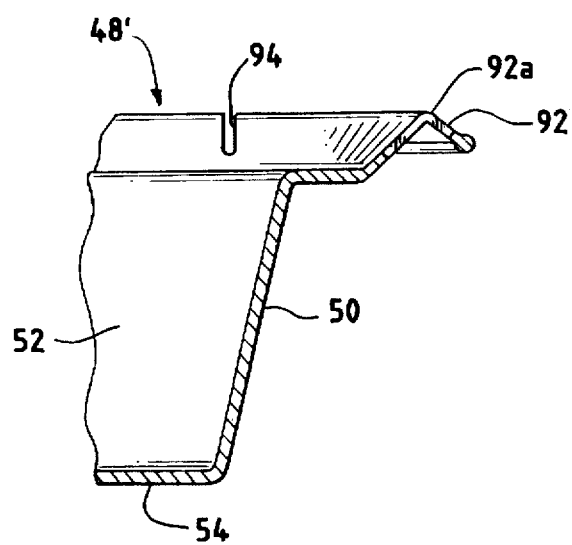
FIG. 14 is a fragmented vertical section, on an enlarged scale, taken generally along line 14—14 of FIG. 13.

FIGS. 13 and 14 show a modified food tray 48' which, again, includes side walls 50, end walls 52 and a bottom wall 54 defining an open top which is surrounded by an inverted V-shaped sealing lip 92. The inverted V-shaped sealing lip defines an upwardly projecting apex 92a which is effective to sealingly engage the ceiling 58 of a respective one of the housing cavities 34. The sealing lip also could be hemispherical in cross-section to provide a rounded sealing surface. Cross slits 94 and longitudinal slits 96 can be provided in sealing lip 92 to increase the flexibility thereof.

FIGS. 15 and 16 show a type of molded seal 98 that runs continuously about the periphery of food tray 48, with a flexible sealing flange 98a for engaging lip 56' at the top of the tray. Actually, flexible flange 98a engages the inside or the outside of lip 56' depending on which side or end of the tray is engaged. Seal 98 can be removably attached by appropriate brackets to the ceiling or walls of the housing cavity.

FIG. 17 shows a type of seal 100 somewhat similar to seal 98 in FIGS. 15 and 16. However, seal 100 has a bead 100a for engaging the top of lip 56' of the food tray, along with an inner flange 100b for engaging the inside of lip 56'. Bead 100a and flange 100b provide a redundant seal means for seal 100. Again, appropriate brackets can be used to removably mount seal 100 to the ceiling 58 of the housing cavity to provide ready removal of the seal for cleaning and/or replacement.

In either of the embodiments shown in FIGS. 15 and 16 or in FIG. 17, the biasing means of the tray-supporting grate, including stringer rods 66, are not required but may be used for biasing the food tray upwardly toward the ceiling of the housing cavity to assure operability of seal means 98 or 100.

Lastly, FIG. 18 shows a canopy seal, generally designated 102, fabricated of sheet material and including a top sheet 102a and side draping sheets 102b, all of which can be a single sheet of material. Hems 104 are formed at the front and rear of top sheet 102a and through which a pair of support rods 106 are extended. The rods hang from J-brackets 108 or other support means mounted to the ceiling 58 of the housing cavity 34. The J-brackets 108 form hooks 108a in which support rods 106 are positioned so that the entire canopy seal can be readily removed for cleaning and/or replacement purposes. As tray 48 is moved into and out of position beneath canopy seal 102, in the direction of double-headed arrow "E", side sheets 102b engage the outside of the sides of lip 56' of the food tray, and when the tray is fully inserted into position, top sheet 102a rests on top of the lip.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A food warming apparatus, comprising:

a housing defining at least one warming cavity having a ceiling;

heating means for warming food products within the cavity;

a grate within the cavity spaced below the ceiling of the cavity;

at least one food tray for containing food products and supportable on the grate beneath the ceiling of the cavity;

seal means operatively associated between the top of the tray and the ceiling of the cavity; and the grate including biasing means for biasing the tray upwardly toward the ceiling to assure operability of the seal means.

2. The food warming apparatus of claim 1 wherein said grate includes spring rod members to provide said biasing means.

3. The food warming apparatus of claim 2 wherein said grate is of a size for supporting a plurality of said food trays, with some of said spring rod members being positioned to support only individual ones of the trays so that the biasing means for one tray is independent of the biasing means for any other tray.

4. The food warming apparatus of claim 2 wherein said food tray is elongated and some of said spring rod members extend in the direction of elongation of the food tray, with riser means spaced along the spring rod members for engaging the bottom of the tray only near opposite ends of the tray.

5. The food warming apparatus of claim 4 wherein said riser means comprise integral hump portions formed in the spring rod members.

6. The food warming apparatus of claim 4 wherein said riser means comprise sleeve members mounted on the spring rod members.

7. The food warming apparatus of claim 1 wherein said grate is of a size for supporting a plurality of said foods trays, and the grate includes biasing means for each tray independent of the biasing means for any other tray.

8. The food warming apparatus of claim 1 wherein said seal means is on the top of the food tray.

9. The food warming apparatus of claim 8 wherein said seal means comprises a flexible lip about a substantial portion of the top of the food tray.

10. The food warming apparatus of claim 1 wherein said seal means is on the ceiling of the cavity.

11. The food warming apparatus of claim 10, including mounting means for readily removably securing the seal means to the ceiling to allow for ready removal of the seal means for cleaning and replacement.

12. The food warming apparatus of claim 11 wherein said seal means comprises a seal member for engaging peripheral upper lip means of the food tray, and said mounting means includes a readily removable clamp for securing the seal member to the ceiling of the cavity.

13. The food warming apparatus of claim 1 wherein said food tray has opposite ends and includes a flexible upper lip extending between the ends, and said ceiling is convex in the direction of the opposite ends of the tray for engaging the flexible upper lip.

14. A food warming apparatus, comprising:

a housing defining at least one warming cavity having a ceiling;

heating means for warming food products within the cavity;

tray support means within the cavity spaced below the ceiling of the cavity;

at least one food tray for containing food products and positionable on the tray support means, the food tray having at least one side with a flexible upper lip; and wherein at least a portion of the ceiling is convex in the direction of said at least one side of the food tray for engaging said flexible upper lip.

15. The food warming apparatus of claim 14 wherein said food tray is elongated with two short sides and two long sides, the ceiling being convex in the direction of the long sides of the tray.

16. The food warming apparatus of claim 14, including biasing means for biasing the tray upwardly toward the ceiling and the flexible upper lip against the convex portion of the ceiling.

17. The food warming apparatus of claim 16 wherein said tray support means comprises a grate having spring rod members to provide said biasing means.

18. The food warming apparatus of claim 17 wherein said food tray is elongated and some of said spring rod members extend in the direction of elongation of the food tray, with riser means spaced along the spring rod members for engaging the bottom of the tray only near opposite ends of the tray.

19. The food warming apparatus of claim 18 wherein said riser means comprise integral hump portions formed in the spring rod members.

20. The food warming apparatus of claim 18 wherein said riser means comprise sleeve members mounted on the spring rod members.

21. The food warming apparatus of claim 16 wherein said grate is of a size for supporting a plurality of said foods trays, and the grate includes biasing means for each tray independent of the biasing means for any other tray.

22. The food warming apparatus of claim 14 wherein said tray support means include riser means spaced in said longitudinal direction for engaging the bottom of the food tray only near opposite ends of the tray.

23. A food warming apparatus, comprising:

a housing defining at least one warming cavity having a ceiling;

heating means for warming food products within the cavity;

a grate within the cavity spaced below the ceiling of the cavity;

at least one food tray for containing food products and supportable on the grate beneath the ceiling of the cavity; and the grate including biasing means for biasing the tray upwardly into engagement with the ceiling of the warming cavity in the housing.

24. The food warming apparatus of claim 23 wherein said grate includes spring rod members to provide said biasing means.

25. The food warming apparatus of claim 24 wherein said grate is of a size for supporting a plurality of said food trays, with some of said spring rod members being positioned to support only individual ones of the trays so that the biasing means for one tray is independent of the biasing means for any other tray.

26. The food warming apparatus of claim 25, including tie rods for joining said some of the spring rod members for each individual tray to provide additional support for the spring rod members without interfering with the provision of biasing means for each food tray, which is independent of the biasing means for any other tray.

27. The food warming apparatus of claim 24 wherein said food tray has opposite ends and some of said spring rod members extend in the direction of the opposite ends of the food tray, with riser means spaced along the spring rod members for engaging the bottom of the tray only near opposite ends of the tray.

28. The food warming apparatus of claim 27 wherein said riser means comprise integral hump portions formed in the spring rod members.

29. The food warming apparatus of claim 27 wherein said riser means comprise sleeve members mounted on the spring rod members.

30. The food warming apparatus of claim 23 wherein said grate is of a size for supporting a plurality of said foods trays, and the grate includes biasing means for each tray independent of the biasing means for any other tray.

31. A food warming apparatus, comprising:

a housing defining at least one warming cavity having a ceiling;

heating means for warming food products within the cavity;

tray support means within the cavity spaced below the ceiling of the cavity;

at least one food tray for containing food products and positionable on the tray support means beneath the ceiling of the cavity;

seal means operatively associated between the top of the tray support means and the ceiling of the cavity; and biasing means for biasing the tray upwardly toward the ceiling to assure operability of the seal means.

32. The food warming apparatus of claim 31 wherein said seal means is on the top of the food tray.

33. The food warming apparatus of claim 32 wherein said seal means comprises a flexible lip about a substantial portion of the top of the food tray.

34. The food warming apparatus of claim 31 wherein said food tray is elongated and includes a flexible upper lip therealong, and said ceiling is convex in the longitudinal direction of the tray for engaging the flexible upper lip.

* * * * *